(12) United States Patent  
Kusakabe et al.

(10) Patent No.: US 12,015,309 B2  
(45) Date of Patent: Jun. 18, 2024

(54) ROTOR AND BRUSHLESS MOTOR

(71) Applicant: MABUCHI MOTOR CO., LTD., Chiba (JP)

(72) Inventors: Wataru Kusakabe, Chiba (JP); Yuya Iwasaki, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 154 days.

(21) Appl. No.: 17/665,594

(22) Filed: Feb. 7, 2022

(65) Prior Publication Data

US 2022/0255375 A1 Aug. 11, 2022

(30) Foreign Application Priority Data

Feb. 9, 2021 (JP) ................................. 2021-018920

(51) Int. Cl.
*H02K 1/276* (2022.01)
*H02K 21/16* (2006.01)

(52) U.S. Cl.
CPC ........... *H02K 1/2766* (2013.01); *H02K 21/16* (2013.01)

(58) Field of Classification Search
CPC ....... H02K 1/276; H02K 1/2766; H02K 21/16
USPC .................................................... 310/156.56
See application file for complete search history.

(56) References Cited

U.S. PATENT DOCUMENTS

| | | | | | |
|---|---|---|---|---|---|
| 5,679,995 A | * | 10/1997 | Nagate | ................... | H02K 29/12 310/156.45 |
| 5,864,191 A | * | 1/1999 | Nagate | ................... | H02K 1/276 310/216.106 |
| 7,705,504 B2 | * | 4/2010 | Nakayama | ........... | H02K 1/2766 310/156.56 |
| 7,800,272 B2 | * | 9/2010 | Nakayama | ........... | H02K 1/2766 310/156.56 |
| 7,868,503 B1 | * | 1/2011 | Nakayama | ........... | H02K 1/2766 310/156.56 |
| 8,080,915 B2 | * | 12/2011 | Nakayama | ........... | H02K 1/2766 310/156.43 |
| 9,419,482 B2 | * | 8/2016 | Lee | ...................... | H02K 1/2773 |

(Continued)

FOREIGN PATENT DOCUMENTS

| | | | |
|---|---|---|---|
| DE | 102007036315 A1 | * 2/2009 | ............. H02K 1/276 |
| DE | 102015207663 A1 | * 10/2016 | |

(Continued)

*Primary Examiner* — Alex W Mok
(74) *Attorney, Agent, or Firm* — HAUPTMAN HAM, LLP

(57) ABSTRACT

A columnar core main body including a plurality of laminated cores having the same shape and that has a shaft hole on a rotation center side, a plurality of permanent magnets penetrate around the shaft hole of the core main body in an axial direction and is fixed in each of a plurality of magnet accommodating holes arranged in a circular shape in a circumferential direction, and protrusions in the magnet accommodating holes in one-to-one correspondence. The protrusion protrudes along the circumferential direction and comes into pressure contact with the permanent magnet accommodated in the magnet accommodating hole from the radially inner side. Each of the protrusions is defined by a protrusion forming space extending along the circumferential direction from a radially inner side surface of each magnet accommodating hole, and at least one of the protrusion and the protrusion forming space is on the magnetic pole center.

5 Claims, 7 Drawing Sheets

(56) References Cited

U.S. PATENT DOCUMENTS

| | | | |
|---|---|---|---|
| 11,211,838 B2 | 12/2021 | Aida et al. | |
| 2007/0103024 A1* | 5/2007 | Nakayama | H02K 1/2766 310/156.56 |
| 2013/0057103 A1* | 3/2013 | Han | H02K 1/2773 310/156.12 |
| 2013/0187506 A1* | 7/2013 | Lee | H02K 1/28 310/156.12 |
| 2016/0365779 A1* | 12/2016 | Watanabe | H02K 15/12 |
| 2017/0271932 A1* | 9/2017 | Tanaka | H02K 1/2773 |

FOREIGN PATENT DOCUMENTS

| | | |
|---|---|---|
| JP | 5918958 B2 | 5/2016 |
| JP | WO2018189822 A1 | 7/2019 |

* cited by examiner

OTHER END SIDE ←——————→ ONE END SIDE

ROTOR AND BRUSHLESS MOTOR

RELATED APPLICATIONS

The present application claims priority to Japanese Application No. 2021-018920 filed Feb. 9, 2021, the disclosure of which is hereby incorporated by reference herein in its entirety.

BACKGROUND

Technical Field

The present invention relates to a rotor in which a permanent magnet is disposed inside a core main body, and a brushless motor including the rotor.

Related Art

Conventionally, a so-called interior permanent magnet (IPM) rotor in which a permanent magnet is disposed inside a core main body is known. In such a rotor, centrifugal force generated by rotation of the rotor acts on the permanent magnet, so that the permanent magnet moves, which may cause vibration and noise or damage of the permanent magnet. For this reason, in the IPM rotor, it is required to reliably fix the permanent magnet to the core main body, and various methods have been proposed so far.

For example, Japanese Patent No. 5918958 discloses a rotor core (a core main body) including: a press-fitting protrusion that forms a protrusion in a radial direction to press-fit and fix the magnet; and a notch formed at a position radially separated from the magnet by sandwiching the press-fitting protrusion in a through hole in which a magnet (a permanent magnet) is disposed. According to Japanese Patent No. 5918958, the magnet is press-fitted and fixed by the press-fitting protrusion, and excessive pressure applied to the magnet is suppressed by the notch.

In addition, Republication of PCT International Publication No. WO 2018-189822 filed in Japanese discloses an IPM rotor which includes a first core sheet in which a spring plate portion is provided in a hole portion into which a magnet is inserted and a second core sheet in which a recess portion is provided at a position corresponding to a site where the spring plate portion of the first core sheet is provided, and is configured by laminating these core sheets. With such a configuration, when the magnet is inserted into the IPM rotor, the spring plate portion pushed and bent by the magnet can escape into the recess portion of the second core sheet, and the magnet can be held by the restoring force of the spring plate portion.

SUMMARY

However, in the configuration of Japanese Patent No. 5918958, the press-in force becomes too large, and when the magnet is inserted into the rotor core, the rotor core is scraped and residue may be generated. In addition, since in Republication of PCT International Publication No. WO 2018-189822 filed in Japanese, a configuration in which core sheets having different shapes are laminated is provided, transferring is required, which leads to an increase in mold cost. Furthermore, there is a possibility of a flow of a magnetic flux being hindered depending on the positions of the protrusions, the recess portions, or the like, and the arrangement thereof is important from the viewpoint of securing the performance of the motor.

As a method of fixing the magnet, a method of using an adhesive without forming a protrusion or the like is also conceivable. However, the fixing method using the adhesive may require dedicated equipment for application depending on the type of adhesive, and in a case of a liquid adhesive, it takes time to cure the adhesive, and thus it is not preferable for improving production efficiency. In addition, since adhesives generally have a consumption period, attention is also required for management (storage) of the adhesives.

The present invention has been made in view of such a problem, and an object thereof is to provide a rotor and a brushless motor capable of fixing a permanent magnet with an appropriate press-in force while securing motor performance and suppressing manufacturing cost. Not limited to this object, it is another object of the present invention to achieve operational effects derived from each configuration described in the embodiments for carrying out the invention that will be described later, which cannot be obtained by the conventional technique.

(1) A rotor disclosed herein includes a columnar core main body that includes a plurality of laminated cores having the same shape and that has a shaft hole on a rotation center side, a plurality of permanent magnets provided to penetrate around the shaft hole of the core main body in in an axial direction and accommodated and fixed in respective magnet accommodating holes arranged in a circular shape in a circumferential direction, protrusions that are provided in the magnet accommodating holes in one-to-one correspondence and protrude along the circumferential direction to be in come into pressure contact with the permanent magnet accommodated in the magnet accommodating holes from in a radially inner side. Each of the protrusions is defined by a protrusion forming space extending along the circumferential direction from a radially inner side surface of each of the magnet accommodating holes, and at least one of the protrusion and the protrusion forming space are positioned on a d-axis which is a magnetic pole center.

That is, one protrusion is provided for one permanent magnet, and each protrusion is provided asymmetrically with respect to the d-axis.

(2) It is preferable that a length of the protrusions in a width direction orthogonal to a protruding direction be twice or less a plate thickness of one laminated core.

(3) It is preferable that the length of the protrusions in the width direction be equal to or greater than the plate thickness.

(4) It is preferable that a length of the protrusions in a protruding direction be longer than a length of the protrusion in a width direction orthogonal to the protruding direction.

(5) In addition, a motor disclosed herein includes the rotor according to any one of (1) to (4), a shaft that rotates integrally with the rotor, and a stator that is fixed to a housing, has a space in which the rotor is disposed on an inner diameter side, and has a coil.

According to the rotor and the brushless motor of the disclosure, since the protrusion is easily elastically deformed, the permanent magnet can be fixed to the core main body with appropriate press-in force. In addition, since the protrusion and the protrusion forming space do not hinder the flow of the magnetic flux, performance can be secured. Furthermore, since a special mold or a dedicated facility is unnecessary, the manufacturing cost can be suppressed.

DETAILED DESCRIPTION

A rotor and a brushless motor will be described as embodiments with reference to the drawings. The embodiments described below are merely examples, and there is no intention to exclude the application of various modifications and techniques that are not explicitly described in the following embodiments. Each configuration of the present embodiment can be implemented with various modifications without departing from the spirit thereof. In addition, selections according to necessity, or appropriate combinations are also possible.

[1. Configuration]

Figure 1:
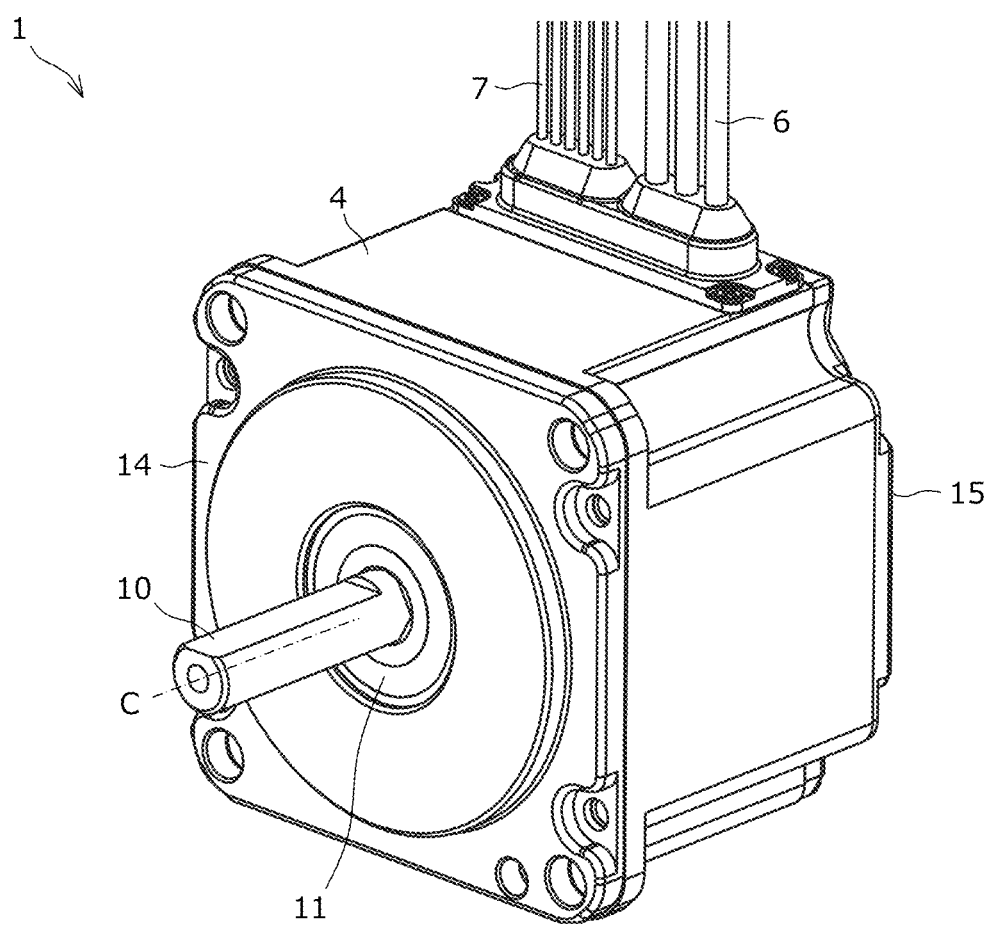
FIG. 1 is a perspective view of a brushless motor according to an embodiment.
Figure 2:
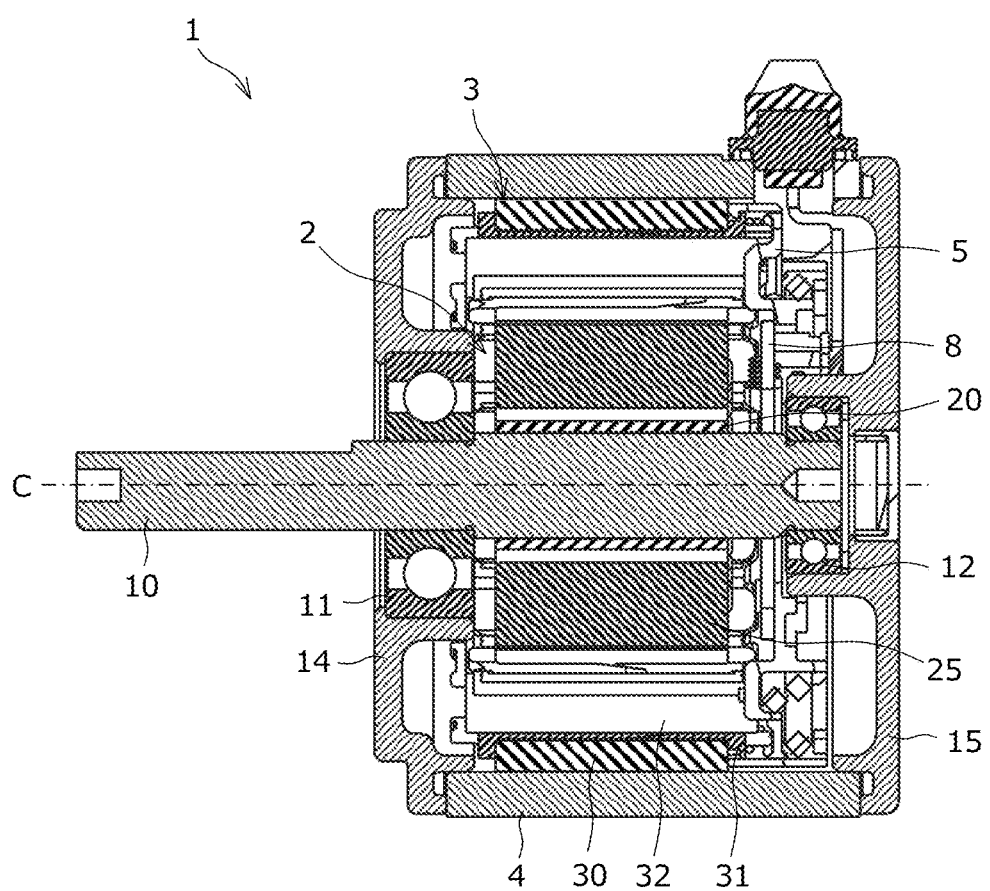
FIG. 2 is a cross-sectional view in an axial direction of the brushless motor of FIG. 1.

FIG. 1 is a perspective view of a brushless motor 1 (hereinafter referred to as a "motor 1") according to the present embodiment, and FIG. 2 is an axial sectional view of the motor 1. The motor 1 is an inner rotor type brushless DC motor and is configured by incorporating a rotor 2 to which a shaft 10 is fixed and a stator 3 fixed to a housing 4 in the housing 4 forming an outer contour of the motor 1. The housing 4 has a tubular shape with both axial ends opened, an end bell 15 is fixed to an opening on one end side (right side in FIG. 2), and a front bell 14 is fixed to an opening on the other end side (output side, left side in FIG. 2). The external shape of the housing 4 of the present embodiment is a substantially rectangular parallelepiped. However, the shape of the housing 4 is not limited thereto.

Figure 3:
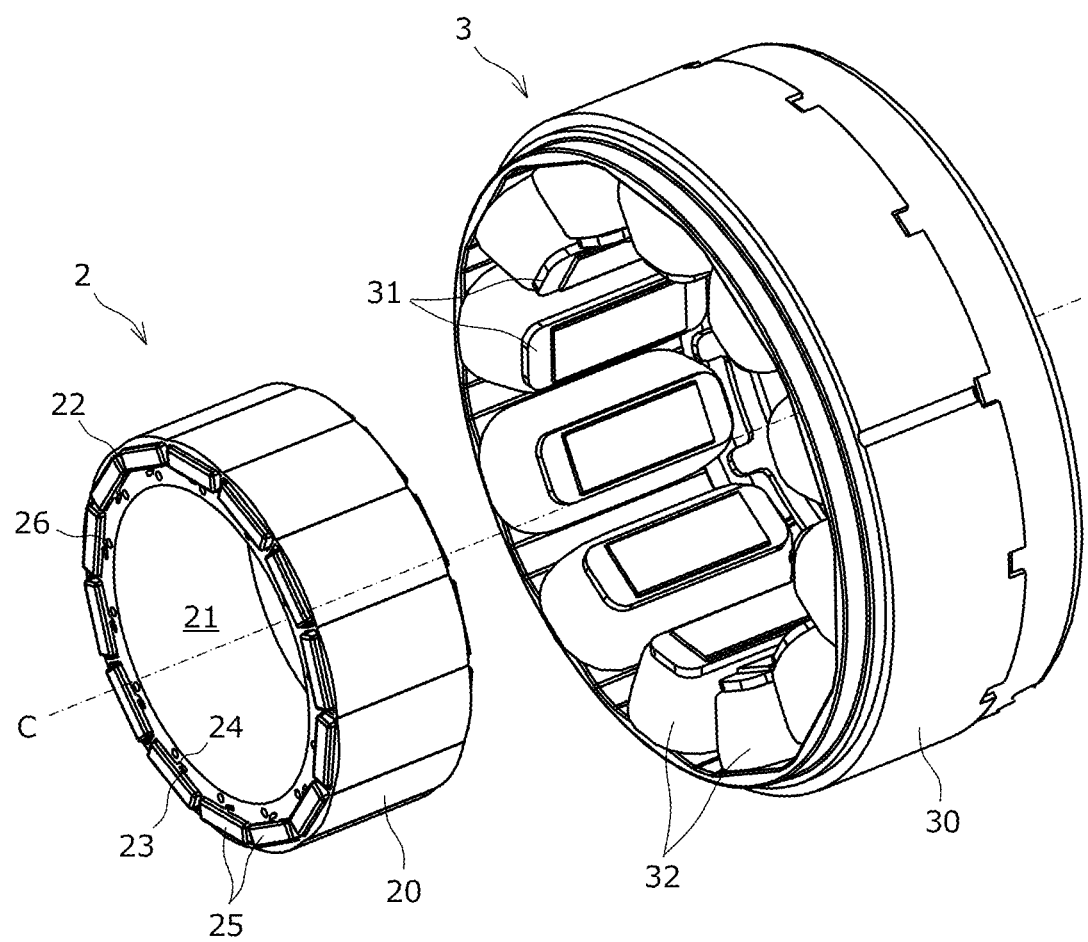
FIG. 3 is an exploded perspective view illustrating a rotor and a stator of the brushless motor of FIG. 1.

FIG. 3 is a perspective view illustrating the rotor 2 of the present embodiment disassembled from the stator 3, and the shaft 10, the housing 4, and the like are omitted. As illustrated in FIGS. 2 and 3, the stator 3 is a substantially cylindrical component having a space in which the rotor 2 is disposed on the inner diameter side, and includes an annular stator core 30 press-fitted and fixed to the housing 4 and a coil 32 wound around the stator core 30 via an insulator 31. As illustrated in FIGS. 1 and 2, the stator 3 of the present embodiment includes a lead wire 6 for power input connected to the coil 32, a lead wire 7 for sensor signal input/output, a lead wire stopping component 5 that supports the lead wire 6, and a substrate 8 having a rotation detection element that detects a signal in accordance with the rotational position of the rotor 2. The configuration of the stator 3 is not limited thereto, and for example, the lead wire stopping component 5 may be omitted, or a component for supporting the substrate 8 may be separately provided.

As illustrated in FIGS. 2 and 3, the rotor 2 is an interior permanent magnet (IPM) rotor including a rotor core 20 (a core main body) that rotates integrally with the shaft 10 about a rotation center C, and a plurality of magnets 25 (permanent magnets) fixed inside the rotor core 20. The shaft 10 is a rotating shaft that supports the rotor 2, and also functions as an output shaft that extracts output (mechanical energy) of the motor 1 to the outside. The shaft 10 is provided with bearings 11 and 12 at two positions with the rotor 2 interposed therebetween. In the present embodiment, the bearing 11 is fixed to the front bell 14 to rotatably support the intermediate portion of the shaft 10, and the bearing 12 is fixed to the end bell 15 to rotatably support the end (right end in the drawing) of the shaft 10.

Figure 4:
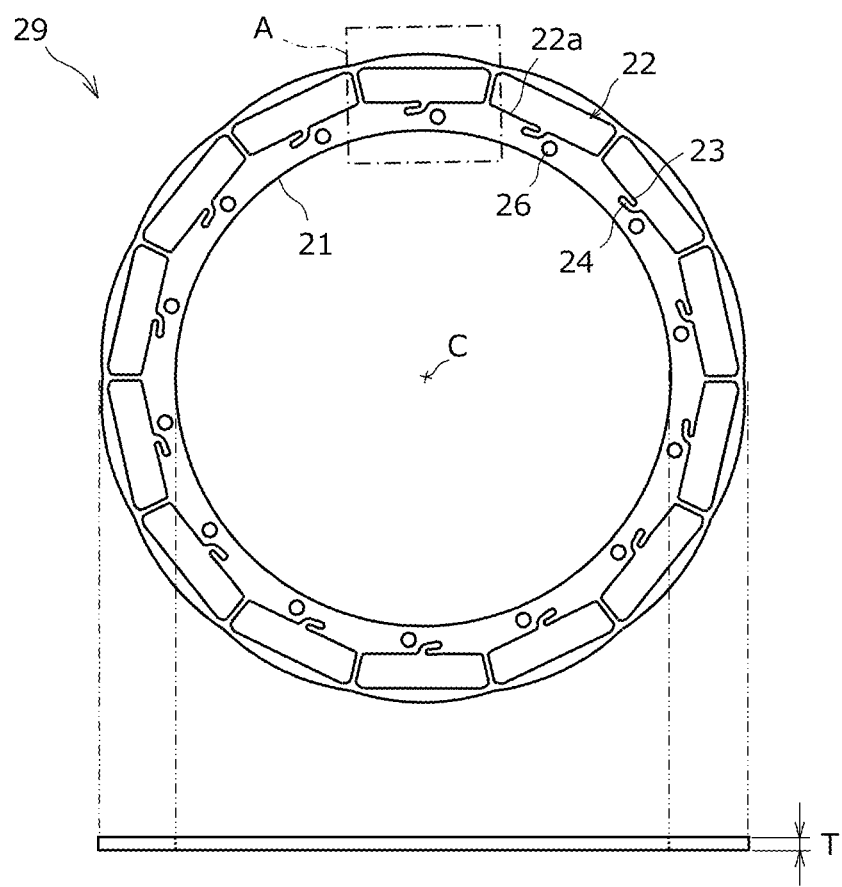
FIG. 4 is a view for explaining a laminated core configuring the rotor of FIG. 3.

The rotor core 20 is configured by laminating a plurality of laminated cores 29 in the axial direction. FIG. 4 illustrates a plan view of the laminated core 29 of the present embodiment. The laminated core 29 is a thin electromagnetic steel plate having a shaft hole 21 to which the shaft 10 is fixed on the rotation center C side, and is formed in the same shape. A plurality of magnet accommodating holes 22 is provided to penetrate around the shaft hole 21 of the laminated core 29 in the axial direction. The magnet accommodating holes 22 are through holes in which the magnet 25 is accommodated and fixed and are provided equal in number to magnets 25. In the rotor 2 of the present embodiment, 14 of each of the magnets 25 and the magnet accommodating holes 22 are provided. However, the number is not limited thereto.

Figure 5:
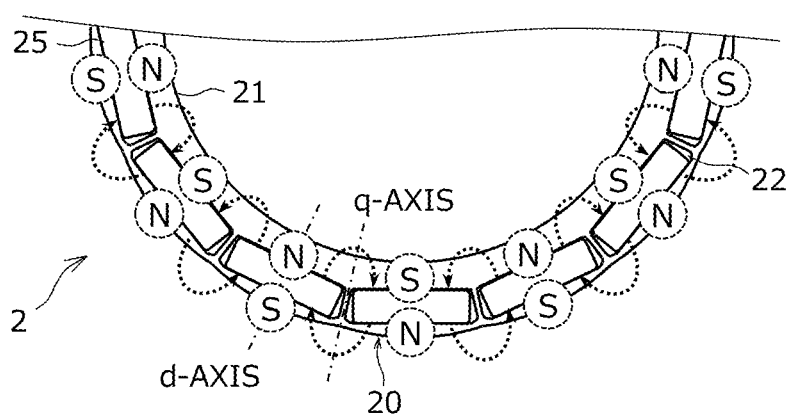
FIG. 5 is a view for explaining a flow of a magnetic pole and a magnetic flux of the rotor of FIG. 3.

The plurality of magnet accommodating holes 22 is arranged side by side in a circular shape in the circumferential direction as viewed from the axial direction along the outer periphery of the laminated core 29. The plurality of magnets 25 is accommodated in the magnet accommodating holes 22 in one-to-one correspondence. However, as illustrated in FIG. 5, the magnet poles (N poles and S poles) of the magnets 25 adjacent to each other in the circumferential direction are disposed opposite to each other. As a result, a flow of the magnetic flux as indicated by a broken line arrow in the drawing is generated between the adjacent magnets 25.

Figure 6A:
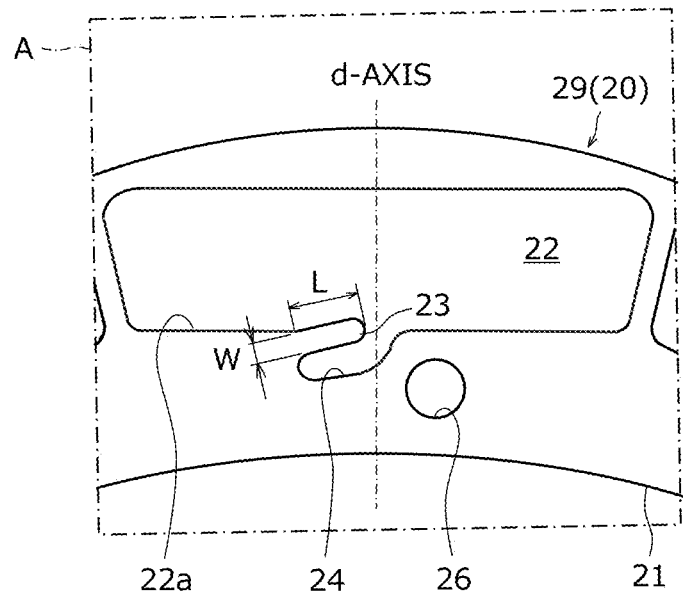
FIG. 6A is an enlarged view of a portion A in FIG. 4.

As illustrated in FIGS. 4 and 6A, the magnet accommodating holes 22 of the present embodiment have isosceles trapezoidal shapes that are long in a direction orthogonal to the radial direction and have R at corner portions when viewed from the axial direction, and radially outer surfaces (portions corresponding to the "upper bases" or the "lower bases" of the trapezoids) are wider than radially inner surfaces (portions corresponding to the "lower bases" or the "upper bases" of the trapezoids). Two magnet accommodating holes 22 adjacent in the circumferential direction are provided such that adjacent end surfaces (surfaces extending in the radial direction and portions corresponding to trapezoidal "legs") are parallel to each other and a gap is formed between these two end surfaces. This gap portion overlaps a q-axis (see FIG. 5) which is a magnetic pole boundary.

Figure 6B:
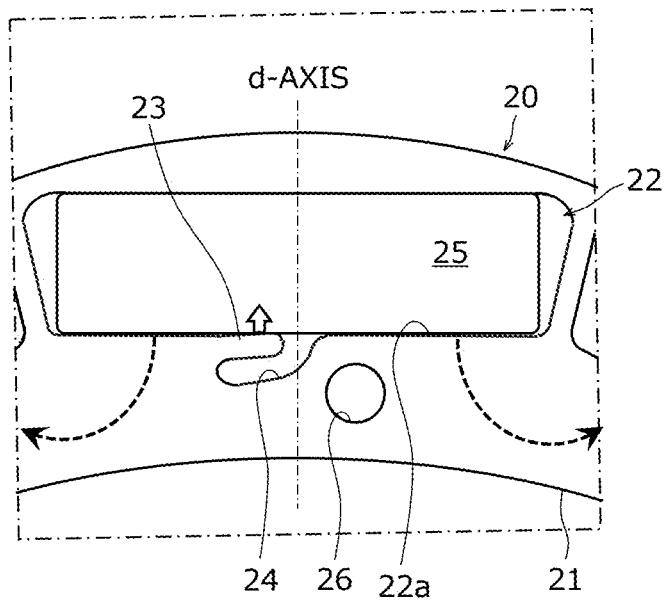
FIG. 6B is a view illustrating a rotor core in which a magnet is press-fitted in FIG. 6A.

As illustrated in FIGS. 2 and 3, the magnets 25 have rectangular parallelepiped shapes having an axial length equivalent to the axial length of the rotor core 20. More specifically, as illustrated in FIG. 6B, when viewed from the axial direction, the height (the radial dimension) of the rectangles of the axial end surfaces of the magnets 25 is equal to the radial length corresponding to the "height" of the trapezoids of the magnet accommodating holes 22, and the width (the dimension in the direction orthogonal to the radial direction) of the rectangles is such that slight gaps are formed between the rectangles and the surfaces corresponding to the "legs" of the magnet accommodating holes 22. The magnets 25 are fixed to the rotor core 20 by press fitting without using an adhesive. The rotor 2 is provided with protrusions 23 for press-fitting and fixing the magnets 25 and a protrusion forming space 24 for forming the protrusions 23.

As illustrated in FIGS. 4 and 6A, the protrusions 23 are provided in the magnet accommodating holes 22 in one-to-one correspondence and are provided equal in number the magnet accommodating holes 22 and the magnets 25. The protrusions 23 protrude in the circumferential direction on a radially inner side surface 22a (hereinafter referred to as an "inner side surface 22a") of the magnet accommodating holes 22. That is, the protruding direction of the protrusions 23 is mainly a circumferential component, extends along the inner side surface 22a of the magnet accommodating holes 22 when viewed from the axial direction, and is formed in an asymmetric shape with respect to the d-axis which is the center of the magnetic pole. The protrusion 23 of the present embodiment protrudes toward the d-axis when viewed from the axial direction and a part of the protrusion 23 is provided to enter the inside of the magnet accommodating hole 22.

As illustrated in FIG. 6B, when the magnets 25 are accommodated in the magnet accommodating holes 22, the protrusions 23 are elastically deformed toward the rotation center C side, and come into pressure contact with the magnets 25 accommodated in the magnet accommodating holes 22 from the radially inner side. As a result, the protrusions 23 press the magnets 25 radially outward as indicated by an outlined arrow in the drawing, and fix the magnets 25 in the magnet accommodating holes 22.

As illustrated in FIGS. 6A and 6B, the protrusions 23 are defined by the protrusion forming space 24 extending in the circumferential direction from the inner side surface 22a of the magnet accommodating holes 22. The protrusion forming space 24 is a notch (a hole portion) penetrating in the axial direction and communicating with the magnet accommodating holes 22, and is provided on the radially inner side of the protrusions 23. At least one of the protrusions 23 and the protrusion forming space 24 are positioned on the d-axis. In the present embodiment, the protrusion forming space 24 is provided to overlap the d-axis, and the protrusions 23 are provided close to the d-axis. As described above, since both the protrusions 23 and the protrusion forming space 24 are provided in the vicinity of the center of the magnets 25 in the width direction (the direction orthogonal to the radial direction), the flow of magnetic flux (the broken line arrow in the drawing) is not hindered. A positioning hole 26 is formed near the d-axis with a gap from the protrusion forming space 24.

As illustrated in FIG. 6A, in the rotor 2 of the present embodiment, a length L of the protrusions 23 in a protruding direction (hereinafter referred to as a "protruding length L") is longer than a length W in a width direction orthogonal to the protruding direction of the protrusions 23 (hereinafter referred to as a "width dimension W"). As a result, the protrusion 23 is easily elastically deformed and the press-in force does not become excessive. In addition, the width dimension W of the protrusions 23 of the present embodiment are formed to be twice or less the plate thickness T (see FIG. 4) of one laminated core 29. Since the press-in force increases as the width dimension W of the protrusions 23 increases, setting the width dimension W to twice or less of the plate thickness T suppresses excessive press-in force. Furthermore, in the present embodiment, the width dimension W of the protrusions 23 is set to be equal to or larger than the plate thickness T, and normal pressing can be performed.

[2. Action and Effect]

(1) In the rotor 2 described above, since the protrusion 23 protrudes along the circumferential direction instead of the radial direction (including a circumferential component of the protrusion 23 in the protruding direction), the protrusion 23 is easily elastically deformed, and the press-in force when the magnet 25 is press-fitted can be optimized. As a result, it is possible to solve the problem of the "residue generation" that occurs in a case where the press-in force is excessive.

Figure 7A:
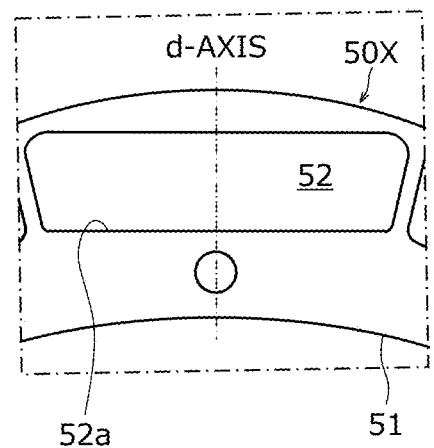
FIGS. 7A to 7C are views (views corresponding to FIG. 6A) for explaining comparative examples.

In addition, as illustrated in FIG. 7A as a comparative example, in a case where a magnet (not illustrated) is press-fitted and fixed to a rotor core 50X having no protrusion, the shape of a magnet accommodating hole 52 is slightly smaller than the outer shape of the magnet (not illustrated) to provide a press-in margin. However, in this case, the press-in force becomes excessive and the residue is generated. On the other hand, in the case of the rotor 2 (the rotor core 20) described above, since the press-in force can be optimized as described above by devising the shape of the protrusion 23, the residue is not generated.

In addition, in the rotor 2 described above, since both the protrusion 23 and the protrusion forming space 24 are disposed near the center in the vicinity of the d-axis, the flow of the magnetic flux is not hindered. As a result, it is possible to prevent a decrease in the magnetic flux and secure the performance of the motor 1.

Figure 7B:
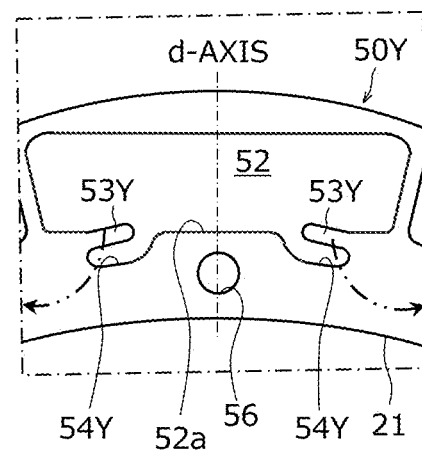
Figure 7C:
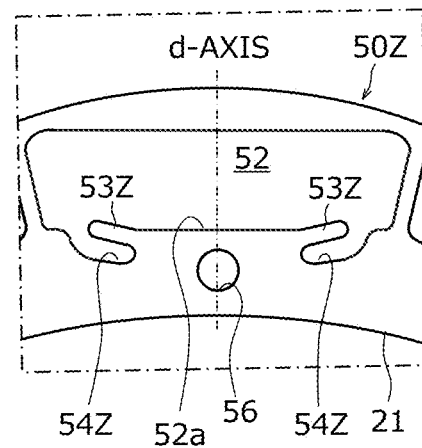

Here, as a comparative example, a rotor core 50Y with two protrusions 53Y is illustrated in FIG. 7B and a rotor core 50Z with two protrusions 53Z is illustrated in FIG. 7C. In these rotor cores 50Y and 50Z, the point that the two protrusions 53Y and 53Z protrude in the circumferential direction from the inner side surface 52a is the same as the protrusion 23 of the rotor core 20 described above. However, the difference is that the number thereof is two and the arrangement is plane symmetric with respect to the d-axis.

More specifically, in the rotor core 50Y illustrated in FIG. 7B, the two protrusions 53Y are separated from each other and protruded toward the d-axis, and a protrusion forming space 54Y extends, from the inner side surface 52a, radially inward and toward the q-axis (not illustrated). In the rotor core 50Z illustrated in FIG. 7C, the two protrusions 53Z are separated from each other and protruded toward the q-axis, and the protrusion forming space 54Z extends, from the inner side surface 52a, radially inward and toward the d-axis. A positioning hole 56 is formed on the d-axis.

As a result of simulating a magnetic flux decreasing rate for each rotor having the rotor cores 50Y and 50Z, the magnetic flux decreasing rate was 3.7% in the rotor having the rotor core 50Y in FIG. 7B, and the magnetic flux decreasing rate was 2.1% in the rotor having the rotor core 50Z in FIG. 7C. The magnetic flux decreasing rate means a rate (%) of decrease with respect to a magnetic flux of a rotor having a rotor core having no protrusion (for example, a rotor core as illustrated in FIG. 7A) as a reference.

That is, as illustrated in FIG. 7B, in a case where two protrusions 53Y are provided for each magnet accommodating hole 52, respectively, since the two protrusions 53Y are disposed apart from each other, each protrusion 53Y overlaps the flow of the magnetic flux (a path of magnetic flux) as illustrated by a two-dot chain line in the drawing. For this reason, the protrusion 53Y and the protrusion forming space 54Y inhibit the flow of the magnetic flux, the magnetic flux decreasing rate increases, and eventually, the performance of the motor is deteriorated. The rotor core 50Z in FIG. 7C also has a high magnetic flux decreasing rate for the same reason.

To solve such a problem, in the rotor 2 described above, as described above, the protrusion 23 and the protrusion forming space 24 are disposed so as not to obstruct the flow of the magnetic flux. As a result of performing the same simulation as FIGS. 7B and 7C on the rotor 2 having the rotor core 20 described above, it has been found that the magnetic flux decreasing rate is 0.0% in the rotor 2. Therefore, according to the motor 1 including the rotor 2, the performance of the motor 1 can be secured.

In addition, since all the plurality of laminated cores 29 configuring the rotor core 20 described above have the same shape, the transferring as in Republication of PCT International Publication No. WO 2018-189822 filed in Japanese is unnecessary. Therefore, the manufacturing cost can be suppressed without causing an increase in mold cost. Furthermore, since the adhesive is not used when the magnet 25 is fixed to the rotor core 20, the advantages of the rotor 2 and the motor 1 described above are that there are no disadvantages that occur when using an adhesive, for example, it requires drying time, dedicated equipment is required, the consumption period of the adhesive needs to be managed, or the like.

(2) In the rotor 2 and the motor 1 described above, since the width dimension W of the protrusion 23 is twice or less the plate thickness T of one laminated core 29, it is possible to prevent the press-in force from becoming excessive, and it is possible to prevent generation of the residue at the time of press-fitting of the magnet 25.

(3) Furthermore, since the width dimension W of the protrusion 23 is equal to or larger than the plate thickness T (that is, "T≤W≤2×T" is satisfied), the laminated core 29 can be formed by normal pressing without using a special mold or the like. Therefore, the manufacturing cost can be suppressed.

(4) In the rotor 2 and the motor 1 described above, since the protrusion length L of the protrusion 23 is longer than the width dimension W, it is possible to secure the spring force accompanying the elastic deformation of the protrusion 23 while preventing the press-in force from becoming excessive.

[3. Others]

The configurations of the rotor 2 and the motor 1 described in the above-described embodiment are merely examples, and are not limited to those described above. For example, the protrusion 23 may be provided at a position overlapping the d-axis, or the protrusion length L and the width dimension W of the protrusion 23 may be set to dimensions different from the above.

Each of the shapes or the configurations of the stator 3, the housing 4, and the like are not limited to those described above.

DESCRIPTION OF THE REFERENCE SYMBOLS

1 motor (brushless motor)
2 rotor
3 stator
4 housing
10 shaft
20 rotor core (core main body)
21 shaft hole
22 magnet accommodating hole
22*a* inner side surface (radially inner side surface)
23 protrusion
24 protrusion forming space
25 magnet (permanent magnet)
25*a* radially inner side surface
29 laminated core
C rotation center
L protrusion length of protrusion (length in protruding direction)
T thickness of laminated core
W width dimension of protrusion (length in width direction)

What is claimed is:

1. A rotor comprising:
   a columnar core main body that includes a plurality of laminated cores having the same shape and that has a shaft hole on a rotation center side;
   a plurality of permanent magnets that is provided to penetrate around the shaft hole of the core main body in an axial direction and is accommodated and fixed in respective magnet accommodating holes arranged in a circular shape in the circumferential direction; and
   protrusions that are provided in the magnet accommodating holes in one-to-one correspondence and protrude in the circumferential direction to come into pressure contact with the permanent magnets accommodated in the magnet accommodating holes from the radially inner side,
   wherein each of the protrusions is defined by a protrusion forming space extending in the circumferential direction from a radially inner side surface of each of the magnet accommodating holes, and
   at least one of the protrusions and the protrusion forming space are positioned on a d-axis which is a magnetic pole center.

2. The rotor according to claim 1,
   wherein a length of the protrusions in a width direction orthogonal to a protruding direction is twice or less a plate thickness of one laminated core.

3. The rotor according to claim 2,
   wherein the length of the protrusions in the width direction is equal to or greater than the plate thickness.

4. The rotor according to claim 1,
   wherein a length of the protrusions in a protruding direction is longer than a length of the protrusions in a width direction orthogonal to the protruding direction.

5. A brushless motor comprising:
   the rotor according to claim 1;
   a shaft that rotates integrally with the rotor; and
   a stator that is fixed to a housing, has a space in which the rotor is disposed on an inner diameter side, and has a coil.

* * * * *